Aug. 21, 1962 W. BESEL 3,049,933
VARIABLE STEPLESS CHAIN GEAR
Filed Feb. 16, 1959 2 Sheets-Sheet 1

INVENTOR
WILHELM BESEL

Aug. 21, 1962 W. BESEL 3,049,933
VARIABLE STEPLESS CHAIN GEAR
Filed Feb. 16, 1959 2 Sheets-Sheet 2

INVENTOR

WILHELM BESEL
BY
Kurt Kelman

United States Patent Office 3,049,933
Patented Aug. 21, 1962

3,049,933
VARIABLE STEPLESS CHAIN GEAR
Wilhelm Besel, Bad Homburg vor der Hohe, Germany, assignor to Firma Reimers-Getriebe KG, Ascona, Tessin, Switzerland
Filed Feb. 16, 1959, Ser. No. 793,443
Claims priority, application Germany Feb. 14, 1958
7 Claims. (Cl. 74—230.17)

The present invention relates to a variable stepless chain transmission comprising an input and an output shaft each provided with a pair of opposite cones with taper surfaces facing each other and a link chain running over said cone pairs in the manner of a V-belt on a corresponding pulley, and frictionally engaging the taper surfaces of the cones for transmitting the power from one pair of cones to the other.

For transmitting the power in such variable stepless chain gears known forms of link chains are fitted at intervals with friction wedge members which take up and deliver the power. These members must be contrived to provide as uniform as possible a power transmission. Known devices employ rollers or balls, the rollers being ring-shaped and embracing the strand of the chain, or cylindrical and supported in each link of the chain by the plates as in cages.

In the known devices the link pins which join the links of the chain are widely spaced to provide room for the rollers. When the chain is fitted with friction wedge members in the form of rings encircling the links, because of the greater cross section of these encircling bodies the depth of engagement of the chain between the cone pairs is reduced and the available overall speed range is limited.

Generally speaking, link chains comprising separate friction wedge members are of relatively great weight and therefore give rise to increased centrifugal forces which must be allowed for in assessing the maximum permissible power a gearing employing such chains can transmit.

It was proposed heretofore to make use of the link pins themselves to serve as power transmitting friction wedge members in a stepless chain drive, thus dispensing with separate friction elements and means for supporting them in the chain.

To reduce the wear of the link pins at the joint, power transmitting chains have previously been provided with rocker joints formed by longitudinally split link pins. It is now contemplated by the present invention to combine the simplicity of chain gears, in which the link pins themselves form the frictionally engaging wedge members, with the high power transmitting capacity of a known roller type of chain, and at the same time to reduce the noise besides sufficiently lowering the specific pressure per unit area to lengthen the life of the chain which largely depends upon specific pressure, or conversely to raise the permissible power transmitting capacity without reducing the life of the chain.

The distinguishing feature of a variable stepless chain gear according to the invention therefore resides in link pins which are longitudinally split into two complementary halves which jointly form a rocker joint, and have ends projecting from each side of the chain links with obliquely cut or undular faces which frictionally engage and wedge between the surfaces of the opposite cones in such a manner that the link pins themselves take up the load from one pair of cones and deliver the same to the other.

In the stepless gear of the invention, the two half pins pivot on each other as the chain engages the taper surfaces of each pair of cones, and thereby break the oil film on the cones. The chain of the invention is of simple design and low weight. It has a relatively large number of engaging wedge members per unit of length because of the short pitch of the chain, and the pressure between pins and cones is relatively low since the end faces of the link pins can be shaped to conform to the cooperating taper surfaces of the cones.

According to an additional feature of the invention the half pins are arranged to pivot on a common pivot pin. To this end each half pin is formed with a cylindrical groove axially cut into its rocking face to engage the common pivot pin. The half pins are preferably locked against rotation in one of the respective links which they connect by respective notches in each half pin being engaged by corresponding projections in the side of the link eyeholes.

According to a supplemental feature of the above described chain, the two half pins cooperating with a common pivot pin are each divided into two longitudinal parts. Between the four pin parts a wedge member is mounted on the pivot pin. It has thrust faces for engaging the four parts of the link pin, said thrust faces being obliquely pitched towards the center of curvature of the chain as well as towards the neighbouring joints. The object of this arrangement is to force the link pins apart transversely of the direction of chain travel when the links pivot on their joints, in order to apply an outwardly directed pressure to the surfaces of the cones, said pressure relaxing when the chain links return to linear alignment. When the chain engages the cones, the lateral pressure caused by the tension of the chain actuates a radial movement of the half pins relative to the cone surface.

The relative movement between the link pins and the cones breaks the oil film on the latter. The described arrangement increases the sliding motion between the friction wedge members of the chains and the cones as the chain engages and leaves the cones and thereby ensures improved friction which in turn permits a more efficient transmission of power.

Embodiments of link chains for variable stepless gears according to the invention are shown in the accompanying drawings in which FIG. 1 is a side elevational view of part of a link chain;

Figure 1:
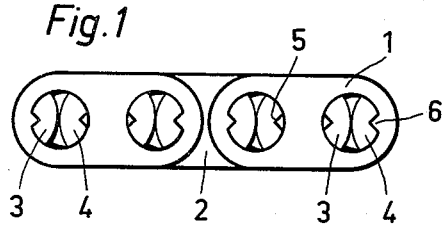
Figure 7:
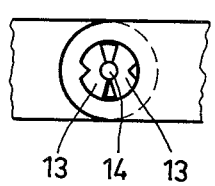
Figure 8:
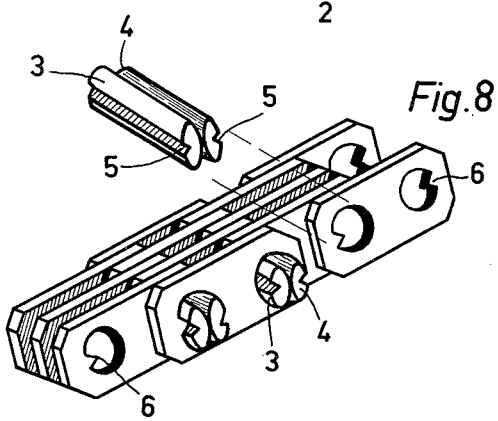

FIG. 7 a side-elevational view of an additional embodiment of the invention;

FIG. 8 is a perspective view of the chain of FIG. 1 in partly disassembled condition.

Figure 9:
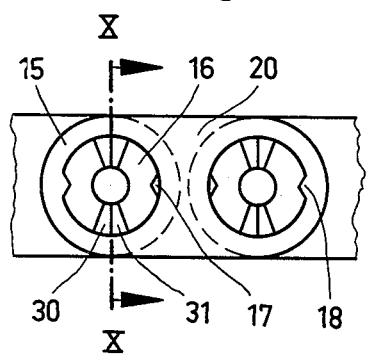
Figure 10:
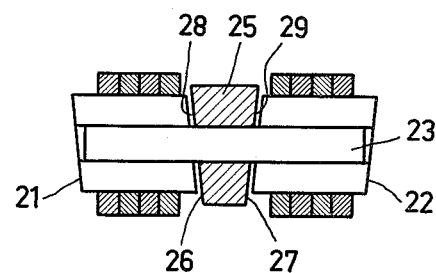
Figure 11:
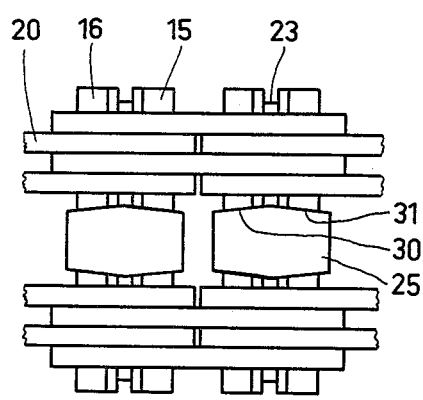

FIG. 9 is a fragmentary side-elevational view of a chain of the invention with link pins divided into four separate parts for each joint, FIG. 10 is a section taken on the line X—X in FIG. 9;

FIG. 11 is a plan view of the portion of chain illustrated in FIG. 9; and

Figure 3:
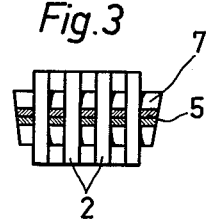
FIG. 3 shows a link of the chain of FIG. 1 in front elevation.
Figure 2:
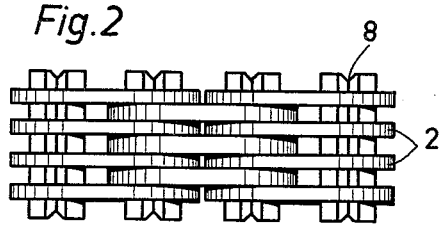
FIG. 2 is a plan view thereof.
Figure 12:
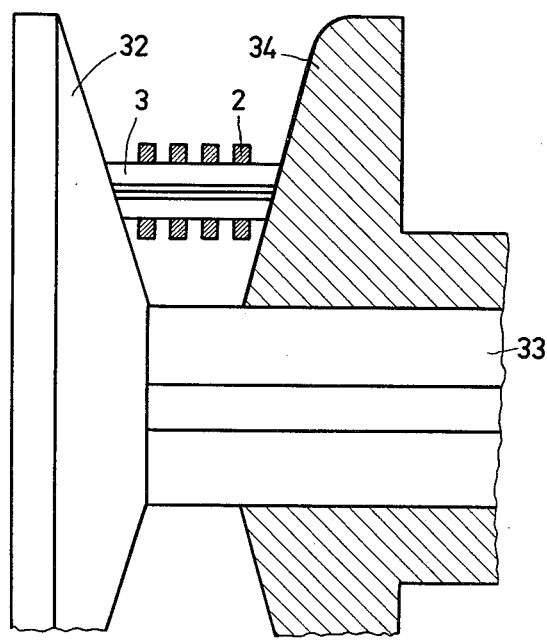

FIG. 12 is a fragmentary front-elevational view, partly in section, of a stepless variable chain transmission including the chain partly shown in FIGS. 1 to 3.

Referring now to FIGS. 1 to 3 in detail, 1 and 2 indicate the links of the chain which each consist of a group of parallel plates and are connected by paired half pins 3, 4. The half pins are of uniform cross section formed by two circular arcs which define two curved surfaces. Each surface is part of a cylinder. One surface is coaxial with the aligned eyeholes of the connected link pins, and abuts thereagainst. The other cylindrical surface engages the corresponding surface of the other half pin in the same joint. The coaxial cylindrical faces of the half pins 3, 4 are formed with respective notches or slots 5. Projections 6 in the eye-holes of the plates adjacent their longitudinal ends engage the notches 5 in the half pins 3, 4 and prevent the latter from rotating relative to a respective one of the connected links. The link pin ends which project laterally from the chain have end faces 7 which are obliquely inclined at the same angle relative to the plane of movement of the chain over the pulleys, said angle corresponding to the wedge angle formed between the cooperating pair of cones of each pulley in the region where the cones are engaged by the chain. These inclined end faces of the half pins are best seen in FIG. 3. Moreover, the edges of the mutually engaged cylinder faces of the half pins 3 and 4 are rounded so that the two half pins form a gap 8 between them as seen in FIG. 2.

Figure 4:
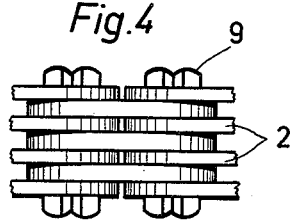
FIGS. 4 and 5 are plan views of two further embodiments.
Figure 5:
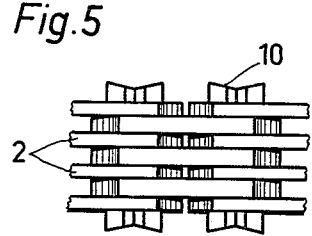

In the chain of the invention illustrated in FIG. 4 the end faces 9 of the half pins are convex. In the embodiment shown in FIG. 5 the end faces 10 are obliquely cut back inwardly so that in plan view the two sloping end faces define a V.

Figure 6:
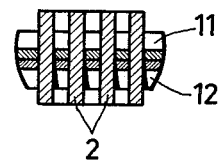
FIG. 6 illustrates a link of yet another embodiment of the invention in front elevation.

The further embodiment of a chain link of the invention in FIG. 6 in front elevation comprises link pin halves 11 the end faces 12 of which are arcuately tapered. In the embodiment of FIG. 7 the half pins 13 have a uniform cross section formed by a circular arc of approximately 150° and two radii defining a cylindrical pin face coaxial with the eyeholes of the corresponding plates and abutting thereagainst and two flat faces converging toward a juncture along the cylinder axis. The half pins 13 are formed with respective cylindrical shaped axial grooves which engage a common pivot pin 14 as a fulcrum.

FIG. 8 is a perspective view of the chain of FIG. 1 from which two half pins 3, 4 have been extracted so that the notch 5 in the half pin 3 is more clearly seen. This notch cooperates with respective projections at the edge of the eyehole nearest the end of the first, third, fifth, and seventh plate of each link joint to prevent the pin from rotating relative to the engaged plates. The other half pin 4 similarly cooperates with the second, fourth, and sixth plates.

When a chain of the kind illustrated engages or leaves the pulley cones, the chain links and the half pins perform a pivoting movement which is especially effective in breaking the oil film on the cones if the half pins are arranged to pivot on a common pivot pin as shown in FIG. 7. There is firm wedging engagement of the pins in the gap between the cones of a pulley, the oil film being swept aside and direct contact between metal and metal assured.

In the embodiment of the chain of the invention illustrated in FIGS. 9 to 11 the half pins each consists of two longitudinal parts 15 and 16. The parts 15 and 16 of each half pin are locked by a notch 17 and projection 18 to link plates 20. The parts 15 and 16 of each half pin are formed with respective oblique bearing faces 21 and 22 which jointly form a wedge. The cross section of the pin parts 15 and 16 is the same as that of the pin halves 13 of the embodiment shown in FIG. 7. Pivot pins 23 are associated with the divided halved link pins to form each rocker joint. Between the four parts of each link pin the pivot pin carries a wedge or spreader member 25 which has thrust faces 26 and 27 which cooperate with conforming inside end faces 28 and 29 of the four parts of the link pin. The thrust faces 26 and 27 taper towards the inside of the chain and consist each of two half faces 30 and 31 which are symmetrical about a transverse plane of symmetry. The corresponding half faces of the two thrust faces 26, 27 taper toward each other in the direction of chain travel away from the plane of symmetry. Each of the half faces is a part of a helix about the axis of the pin 23. Owing to the helical shape of the symmetrical half faces 30, 31 about the axis of their respective pivot pin, complete surface contact will be maintained with the end faces 15, 16 whilst the parts of the half pins move in relation to one another. The pitch of the helical thrust faces is sufficient to prevent the engaging faces from locking. FIG. 12 illustrates the cooperation of the chain of the invention with the V-pulley of a stepless variable chain transmission not otherwise illustrated. The V-pulley consists of a conical disc 32 fixedly mounted on a shaft 33, and of a second disc 34 shown in section which is rotatable and axially slidable on the shaft 33 as is conventional. The V-notch defined between the conical faces of the discs receives a chain trained over the pulley. For the sake of clarity only a single link 2 and the engagement of the corresponding half pin 3 of the chain with the coaxial conical disc faces has been shown.

What I claim is:

1. In a stepless variable chain transmission, two discs having respective opposite coaxial conical faces constituting a V-pulley; and an elongated chain trained over said pulley and including a plurality of longitudinally consecutive links, adjacent ones of said links being formed with aligned openings jointly defining a passage longitudinally extending in a direction transverse of the chain; and two pin members in said passage pivotally connecting said adjacent links, each of said pin members having a face in said passage pivotally engaging the corresponding face of the other pin member for relative movement about an axis extending in said direction, and two end faces axially projecting from said passage for respective frictional engagement with said conical faces.

2. In a transmission as set forth in claim 1, each of said pin members in said passage being secured against pivotal movement relative to a respective one of said adjacent links.

3. In a transmission as set forth in claim 1, pivot pin means in said passage connecting said faces of said pin members in said passage.

4. In a transmission as set forth in claim 1, said end faces tapering in a direction which is radially inward with respect to the pulley axis.

5. In a transmission as set forth in claim 1, each of said pin members being split into two transversely consecutive portions, each of said portions having an additional end face in said passage opposite the additional end face of the other portion, and wedge means in said passage for actuating relative movement of the two portions of each of said pin members when the latter pivot relative to each other.

6. In a transmission as set forth in claim 5, a pivot pin in said passage pivotally connecting the corresponding transverse portions of said pin members, said wedge means being mounted on said pivot pin.

7. In a transmission as set forth in claim 5, said additional end faces being helically shaped about the axis of pivotal engagement of said pin members.

References Cited in the file of this patent

UNITED STATES PATENTS

| | | |
|---|---|---|
| 1,273,001 | Rockenfield | July 16, 1918 |
| 1,743,500 | Sturtevant | Jan. 14, 1930 |
| 2,154,648 | Weston | Apr. 18, 1939 |
| 2,266,688 | Keller | Dec. 16, 1941 |
| 2,330,058 | Keller | Sept. 21, 1943 |
| 2,550,431 | Shaw | Apr. 24, 1951 |
| 2,602,344 | Bremer | July 8, 1952 |
| 2,690,678 | Bendall | Oct. 5, 1954 |